(12) United States Patent
Householder

(10) Patent No.: US 9,459,396 B1
(45) Date of Patent: Oct. 4, 2016

(54) LINEAR INDIRECT LED LIGHTING SYSTEM

(71) Applicant: Universal Lighting Technologies, Inc., Madison, AL (US)

(72) Inventor: John R. Householder, Cedar Park, TX (US)

(73) Assignee: Universal Lighting Technologies, Inc., Madison, AL (US)

(*) Notice: Subject to any disclaimer, the term of this patent is extended or adjusted under 35 U.S.C. 154(b) by 79 days.

(21) Appl. No.: 14/487,815

(22) Filed: Sep. 16, 2014

Related U.S. Application Data

(60) Provisional application No. 61/886,898, filed on Oct. 4, 2013.

(51) Int. Cl.
*F21V 8/00* (2006.01)

(52) U.S. Cl.
CPC ............ *G02B 6/0058* (2013.01); *G02B 6/005* (2013.01); *G02B 6/0021* (2013.01); *G02B 6/0051* (2013.01); *G02B 6/0053* (2013.01); *G02B 6/0068* (2013.01); *G02B 6/0073* (2013.01)

(58) Field of Classification Search
CPC .. G02B 6/0058; G02B 6/0021; G02B 6/005; G02B 6/0051; G02B 6/0053; G02B 6/0068; G02B 6/0073
See application file for complete search history.

(56) References Cited

U.S. PATENT DOCUMENTS

| | | | |
|---|---|---|---|
| 5,656,209 A | 8/1997 | Benz et al. | |
| 6,398,988 B1 | 6/2002 | Jenkins et al. | |
| 7,367,704 B1 | 5/2008 | Chang | |
| 7,537,374 B2* | 5/2009 | Schardt | G02B 6/0055 362/247 |
| 7,559,672 B1 | 7/2009 | Parkyn et al. | |
| 8,251,564 B2 | 8/2012 | Lin et al. | |
| 8,465,190 B2* | 6/2013 | Taskar | F21V 5/04 362/235 |
| 2005/0018147 A1* | 1/2005 | Lee | F21V 7/0091 353/98 |
| 2005/0057731 A1* | 3/2005 | Lee | G03B 21/26 353/94 |
| 2005/0094401 A1* | 5/2005 | Magarill | F21K 9/00 362/296.06 |
| 2008/0260328 A1* | 10/2008 | Epstein | G02B 6/0018 385/32 |

* cited by examiner

*Primary Examiner* — Tracie Y Green
(74) *Attorney, Agent, or Firm* — Patterson Intellectual Property Law, P.C.; Mark J. Patterson

(57) ABSTRACT

An edge-lit lighting apparatus includes a light source and a light guide body. The light guide body includes an input edge, the light source positioned to project light through the input edge in a primary emission direction, the light guide extending from the input edge. The light guide body includes a mean elongation plane which is angularly offset from the primary emission direction. The light guide body includes a reflective side adjacent the input edge and configured to redirect light from the light source. The light guide includes an output side configured to disperse redirected light from the reflected side. The light guide body can extend curvilinearly from the input edge. The lighting apparatus can be configured as an indirect lighting system, and can help increase efficiency for edge-lit lighting systems.

20 Claims, 5 Drawing Sheets

LINEAR INDIRECT LED LIGHTING SYSTEM

CROSS-REFERENCES TO RELATED APPLICATIONS

This application claims benefit of the following patent application(s) which is/are hereby incorporated by reference: Ser. No. 61/886,898, filed Oct. 4, 2013, entitled Linear Indirect LED Lighting System.

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

STATEMENT REGARDING FEDERALLY SPONSORED RESEARCH OR DEVELOPMENT

Not Applicable

REFERENCE TO SEQUENCE LISTING OR COMPUTER PROGRAM LISTING APPENDIX

Not Applicable

BACKGROUND OF THE INVENTION

The present invention relates generally to a light emitter apparatus that disperses light from a light source to a target or desired area. Light emitters can be configured to produce a variety of different lit appearances or lighting profiles.

More particularly, this invention pertains to an edge-lit lighting apparatus. Conventional edge-lit lighting systems include a light source that projects light through an edge of a light guide. As the light travels through the light guide, the light can be reflected downward or generally in a direction transverse to a primary emission direction from the light source. Conventional solutions can allow light to pass through the light guide without being reflected toward the target area, which can undesirably decrease the overall efficiency of the lighting system. Additionally, conventional solutions can allow a direct view of the light source which can produce an undesirable glare for an observer of the lighting apparatus.

What is needed, then, are improvements in edge-lit lighting systems.

BRIEF SUMMARY OF THE INVENTION

The present invention relates to an edge-lit lighting apparatus including a light source and a light guide body. The light guide body can include an input edge with the light source positioned to project light through the input edge in a primary emission direction. The light guide can extend from the input edge. The light guide body can include a mean elongation plane which is angularly offset from the primary emission direction. The light guide body can have a reflective side adjacent the input edge. The reflective side is configured to redirect light from the light source. The light guide body can include an output side configured to disperse redirected light from the reflective side. With such a configuration, a larger percentage of the light projected from the light source can be redirected towards the target area which can help increase the efficiency of the system.

Another aspect of the present invention is an edge-lit light guide apparatus for emitting light from a light source. The apparatus includes a light guide body having an input edge. The light guide body can extend from the input edge and have a mean elongation plane that is angularly offset from a substantially normal reference axis to the input edge. The light guide body can have a reflective side configured to redirect light from the light source when the light source projects light through the input edge. The light guide body can have an output side configured to receive and disperse redirected light from the reflective side.

Another aspect of the present invention is an edge-lit lighting apparatus including a light source and a curved light guide body. The light guide body includes an input edge coupled with the light source. The light source projects light through the input edge in a primary emission direction. The light guide body can extend substantially curvilinearly from the input edge. The light guide body can include a total internal reflective side which can be positioned adjacent the input edge. The total internal reflective side is configured to receive and redirect light from the light source. The light guide body can also include an output side positioned to receive and disperse redirected light from the total internal reflective side.

One object of the present invention is to provide an edge-lit lighting apparatus with improved efficiency.

Another object of the present invention is to provide an indirect edge-lit lighting apparatus having reduced glare.

A further object of the present invention is to provide a low cost edge-lit lighting apparatus.

DETAILED DESCRIPTION OF THE INVENTION

Figure 1:
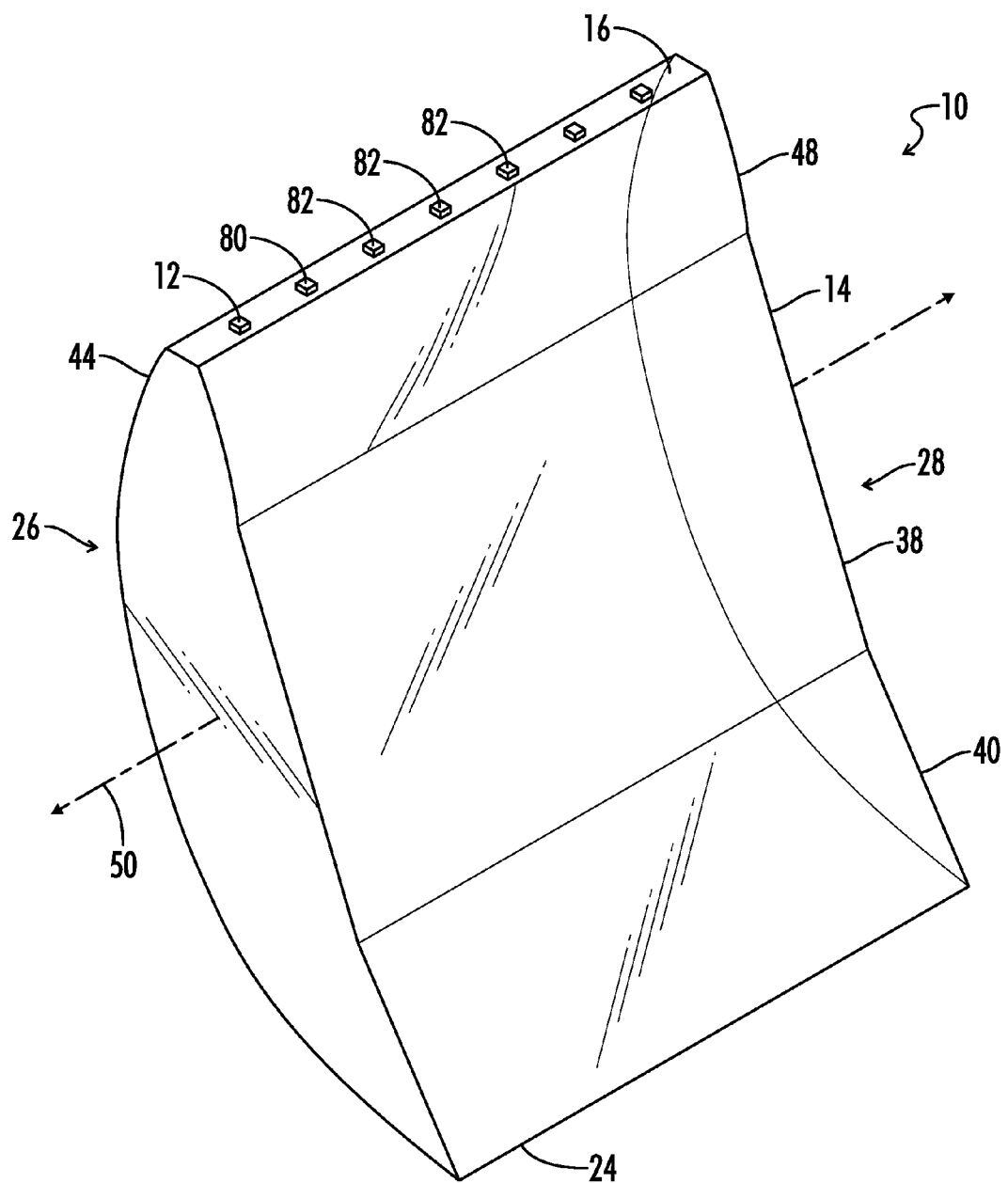
FIG. 1 is a perspective view of a first embodiment of an edge-lit lighting apparatus according to the present invention.

While the making and using of various embodiments of the present invention are discussed in detail below, it should be appreciated that the present invention provides many applicable inventive concepts that is embodied in a wide variety of specific contexts. The specific embodiments discussed herein are merely illustrative of specific ways to make and use the invention and do not delimit the scope of the invention.

To facilitate the understanding of the embodiments described herein, a number of terms are defined below. The terms defined herein have meanings as commonly understood by a person of ordinary skill in the areas relevant to the present invention. Terms such as "a," "an," and "the" are not intended to refer to only a singular entity, but rather include the general class of which a specific example may be used for illustration. The terminology herein is used to describe specific embodiments of the invention, but their usage does not delimit the invention, except as set forth in the claims.

As described herein, an upright position is considered to be the position of apparatus components while in proper operation or in a natural resting position as described herein. Vertical, horizontal, above, below, side, top, bottom and other orientation terms are described with respect to this upright position during operation unless otherwise specified. The term "when" is used to specify orientation for relative positions of components, not as a temporal limitation of the claims or apparatus described and claimed herein unless otherwise specified. The term "lateral" denotes a side to side direction when facing the "front" of an object.

The phrase "in one embodiment," as used herein does not necessarily refer to the same embodiment, although it may. Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

This written description uses examples to disclose the invention and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

It will be understood that the particular embodiments described herein are shown by way of illustration and not as limitations of the invention. The principal features of this invention may be employed in various embodiments without departing from the scope of the invention. Those of ordinary skill in the art will recognize numerous equivalents to the specific procedures described herein. Such equivalents are considered to be within the scope of this invention and are covered by the claims.

All of the compositions and/or methods disclosed and claimed herein may be made and/or executed without undue experimentation in light of the present disclosure. While the compositions and methods of this invention have been described in terms of the embodiments included herein, it will be apparent to those of ordinary skill in the art that variations may be applied to the compositions and/or methods and in the steps or in the sequence of steps of the method described herein without departing from the concept, spirit, and scope of the invention. All such similar substitutes and modifications apparent to those skilled in the art are deemed to be within the spirit, scope, and concept of the invention as defined by the appended claims.

A first embodiment of the present invention is shown in FIG. 1. An edge-lit lighting apparatus 10 includes a light source 12 and a light guide body 14. The light guide body 14 can include an input edge 16. The light source 12 can be coupled with the input edge 16 or otherwise positioned to project light through the input edge 16. The light guide body 14 can extend from the input edge 16 in an elongated fashion. In some embodiments, the light guide body 14 can extend substantially curvilinearly from or in a substantially curvilinear direction from the input edge 16. The light source 12 can be any suitable light source, including but not limited to, LEDs, fluorescent lamps, incandescent bulbs, etc.

Figure 2:
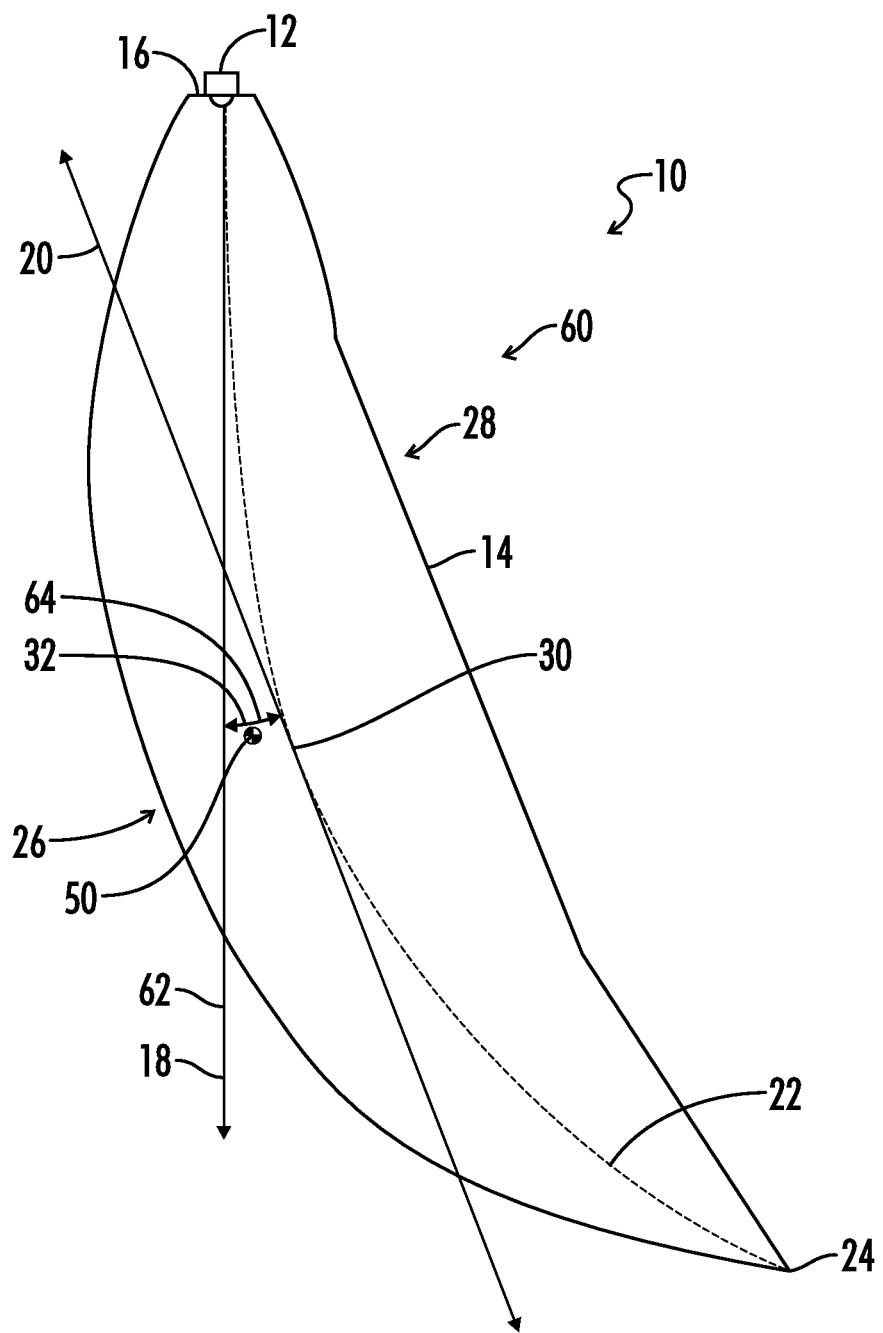
FIG. 2 is a side view of the edge-lit lighting apparatus shown in FIG. 1.

As can be seen in FIG. 2, the light source 12 can project light in a primary emission direction 18. The light guide body 14 can also include a reflective side 26 and an output side 28. The reflective side 26 can be adjacent the input edge 16 and can be configured to redirect light from the light source 12. The output side 28 can be configured to disperse redirected light from reflective side 26 to a desired or target area.

The light guide body 14 can also include a mean elongation plane 20 which is representative of the average elongation direction that the light guide body 14 extends from the input edge 16 to a distal end 24 of light guide body 14. The mean elongation plane 20 is shown in two dimensions in FIG. 2, but the mean elongation plane 20 can extend through the light guide body 14 to form a three dimensional plane.

In some embodiments, the light guide body 14 can include a camber line 22. The camber line 22 can extend from the input edge 16 to a distal end 24 of the light guide body 14. The camber line 22 can represent a line that is equidistant from the reflective side 26 and the output side 28. In some embodiments, as shown in FIG. 2, the camber line 22 is curved or has a curvilinear shape. In some embodiments, the mean elongation plane 20 can represent an average tangent plane to the camber line 22. In some embodiments, the mean elongation plane 20 can be tangent to a midpoint 30 of the camber line 22.

The mean elongation plane 20 in FIG. 2 is angularly offset from the primary emission direction 18. As such, the light guide body 14 is skewed, curved, or elongated in a direction away from the primary emission direction 18. In some embodiments, as shown in FIG. 2, the light guide body 14 can be biased away from the primary emission direction 18 toward the output side 28. The primary emission direction 18 and the mean elongation plane 20 can form an offset angle 32. In some embodiments, the offset angle 32 is between about 10 and about 70 degrees. In other embodiments, the offset angle 32 is between about 20 and about 50 degrees. In still other embodiments, the offset angle 32 is between about 25 and about 35 degrees.

The reflective side 26 of the light guide body 14 can be positioned adjacent to the input edge 16. "Adjacent" as used herein can mean being generally proximate to, next to, or abutting another object. In FIG. 2, the reflective side 26 generally abuts the input edge 16. The reflective side 26 in some embodiments can be a total internal reflective surface, or a surface that is positioned such that light strikes the total internal reflective surface at an angle of incidence with respect to a normal of the surface that is greater than a critical angle. As such, the light is completely reflected by the total internal reflective surface, as opposed to passing through the surface. In other embodiments, the reflective side 26 can be coated with a reflective finish or film which can reflect light from the light source 12 regardless of the angle of incidence. The finish or film can be made from metal or any other suitable reflective material.

As can be seen from FIG. 2, the mean plane of elongation 20 being angularly offset from the primary emission direction 18 can allow the reflective side 26 to traverse or cross the primary emission direction 18. Conventional solutions include light guide bodies that have a straight or linear orientation such that some light passes through the light guide without ever being redirected by the reflective side toward the target area. This can decrease the efficiency of the system as well as the output or brightness of the light being emitted to the target area. Having the reflective side 26 cross the primary emission direction 18 can help redirect more light from the light source 12 towards the target area, which can help increase the overall efficiency and output of the lighting apparatus 10. In some embodiments, substantially all of the light being emitted by the light source 12 can be reflected by the reflective side 26.

Figure 3:
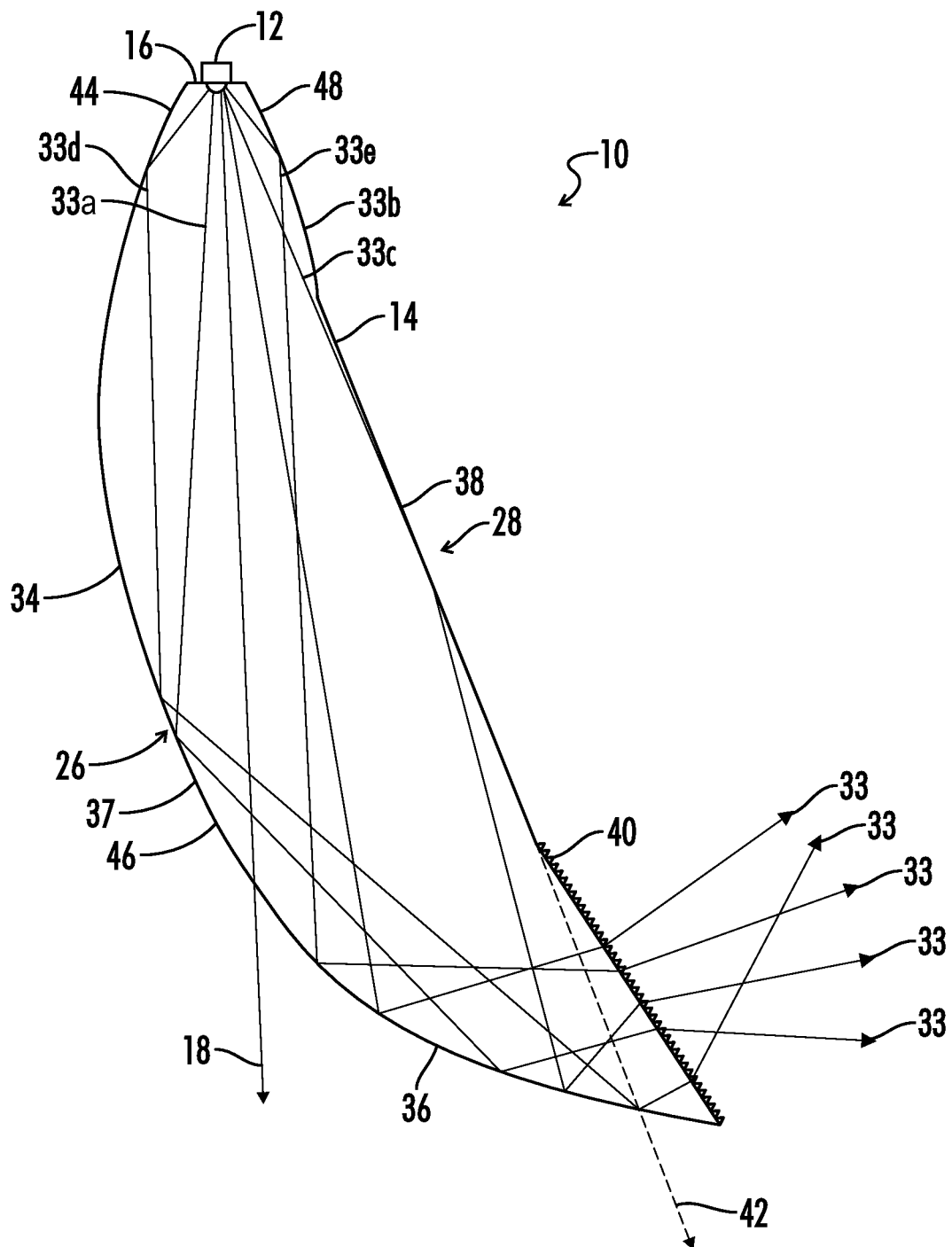
FIG. 3 is a side view of the apparatus of FIG. 1 showing an exemplary light distribution profile within the light guide body.

An exemplary distribution of light 33 within the light guide body 14 of FIG. 2 is shown in FIG. 3. In some embodiments, the reflective side 26 can be a parabolic surface which can allow for total internal reflection of the light 33 from the light source 12 along the entire reflective side 26. In some embodiments, the entire reflective side 26 can be one continuous parabolic surface. In other embodiments, the reflective side 26 can have multiple parabolic surfaces. For instance, the reflective side 26 can have a first reflective surface 34 and a second reflective surface 36. Each of the first and second reflective surfaces 34, 36 can be a distinct parabolic surface, the two parabolic surfaces having a smooth transition or interface 37 between one another. Some of the light 33*a* from the light source 12 can be redirected by the first reflective surface 34, and then be redirected again by the second reflective surface 36 before being emitted by the output side 28. Other light 33*b* from the light source 12 can be reflected once by the second reflective surface 36 before being emitted by the output side 28.

The output side 28 in some embodiments can include diffusers, micro lenses, micro prisms, Fresnel patterns, kinoforms, or any other optical features which can help produce a desired lighting profile for light being emitted from the light guide body 14. The output side 28 in FIG. 3 includes a diffuse surface which can scatter light 33 as the light 33 exits the light guide body 14. Scattering of the light 33 can help reduce glare from the lighting apparatus 10. The angle of the output side 28 with respect to incoming light from the reflective side 26 can also be adjusted or varied for the output side 28 to angularly redirect light as it passes through the output side 28, such that the lighting apparatus 10 can be used as a directional lighting system. Additionally, the optic length of the lighting apparatus 10 can be designed for and scaled to accommodate different uses of the apparatus 10. The lighting apparatus 10 can also offer a range of suitable light source choices which can allow tailoring of the cost/performance optimization of the apparatus 10 for a particular use.

Figure 7:
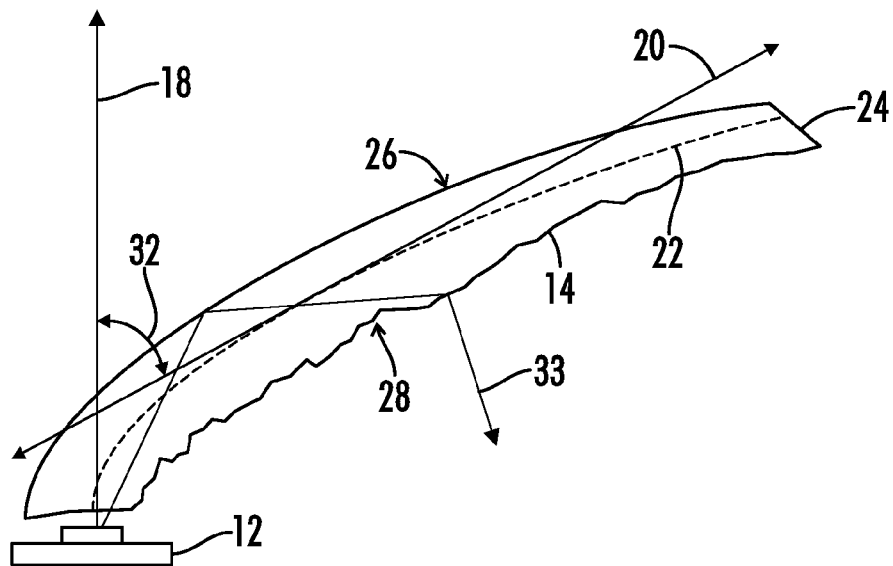
FIG. 7 is a side view of a second embodiment of an edge-lit apparatus according to the present invention.

In some embodiments, as shown in FIG. 7, the entire output side 28 can be an output surface including diffusers, micro lenses, micro prisms, Fresnel patterns, kinoforms, or other optical features. In other embodiments, as shown in FIG. 3, the output side 28 can include a reflective portion 38 and an output portion 40. The reflective portion 38 can redirect light 33*c* from the light source 12 towards the reflective side 26, wherein the reflective side 26 can then redirect the light 33*c* towards the output portion 40, the output portion 40 dispersing the light to the target area.

Thus, in such an embodiment light 33 can be emitted from the light guide 14 through only a portion of the output side 28. In some embodiments, the reflective portion 38 can be a total internal reflective surface. In other embodiments, the reflective portion 38 can include a reflective film or finish.

Providing a reflective portion 38 in output side 28 can help ensure that light projected from the light source 12 is redirected at least once by the light guide body 14, as the reflective portion 38 can redirect light initially projected towards the output side 28 back towards the reflective side 26 of the light guide body 14. Additionally, in some embodiments, the reflective side 26, and particularly the second reflective surface 36, can traverse and extend beyond the primary emission direction 18 such that glare can be reduced by the reflective side 26 from beyond a horizon 42 of the lighting apparatus 10. In some embodiments, the reflective side 26 and the reflective portion 38 of the output side 28 can be positioned to obstruct a direct view of the light source 12 when the lighting apparatus 10 is observed from any angle, thereby preventing any light 33 from the light source 12 from being observing directly. Such a configuration can produce an entirely indirect lighting system which can greatly reduce undesirable glare from the lighting apparatus 10.

In some embodiments, the reflective side 26 can include a first coupling surface 44 and a primary reflective surface 46. The first coupling surface 44 can be adjacent the input edge 16. The reflective portion 38 of the output side 28 can also include a second coupling surface 48 adjacent the input edge 16. The first and second coupling surfaces 44, 48 can be configured to redirect light projecting from the light source 12 towards the primary reflective surface 46. As can be seen from FIG. 3, the first and second coupling surfaces 44 and 48 can help redirect light 33*d* and 33*e* from the light source 12 that initially projects at a relatively large angle with respect to the primary emission direction 18, the first and second coupling surfaces 44 and 48 funneling or concentrating the light 33*d* an 33*e* towards the primary reflective surface 46. In some embodiments, the first and second coupling surfaces 44, 48 can form a compound parabolic surface which can help optimize the angular conversion of the light 33*d* and 33*e* being redirected by the first and second coupling surfaces 44 and 48.

Referring again to FIG. 1, the light guide body 14 can have an extrusion axis 50 extending through the light guide body 14. FIG. 2 shows a side view of the light guide body 14 or a view along the extrusion axis 50. From FIG. 2 it can be seen that the light guide body 14 can have a uniform cross section when viewed along the extrusion axis 50. The light guide body 14 can then be manufactured using extrusion molding processes, which can help reduce the cost of manufacturing the light guide body 14. The light guide body 14 can also be manufactured using any suitable manufacturing process, including but not limited to die casting, injection molding, machining, forging, milling, etc.

Referring again to FIG. 2, another aspect of the invention is a light guide apparatus 60 for emitting light from a light source 12. The light guide apparatus is similar to the light guide body 14 previously described for FIG. 2. The light guide apparatus 60 can include a light guide body 14 having an input edge 16, the light guide body 14 extending from the input edge 16. The light guide body 14 can include a mean elongation plane 20 as previously described for the edge-lit lighting apparatus 10. The mean elongation plane 20 can be angularly offset from a substantially normal reference axis 62 to the input edge 16. An offset angle 64 can be formed between the mean elongation plane 20 and the substantially normal reference axis 62. In some embodiments, the offset angle 64 is between about 10 and about 70 degrees. In other embodiments, the offset angle 64 is between about 20 and about 50 degrees. In still other embodiments, the offset angle 64 is between about 25 and about 35 degrees.

The light guide body 14 can include a reflective side 26 and an output side 28. The reflective side 26 can be configured to redirect light from the light source 12 when the light source 12 projects light through the input edge 16. The output side 28 can be configured to disperse redirected light from the reflective side 26.

When a light source 12 is connected to the light guide apparatus 60, the light from the light source 12 can be projected through the input edge 16 in a primary emission direction 18. The primary emission direction 18 can be substantially parallel to the substantially normal reference axis 62 in some embodiments. The mean elongation plane 20 being angularly offset from the substantially normal reference axis 62 and the primary emission direction 18 can allow the reflective side 26 to traverse the substantially normal axis 62 and the primary emission direction 18. This can help increase the amount of light from the light source 12 that is reflected by the reflective side 26 towards a target area.

Figure 4:
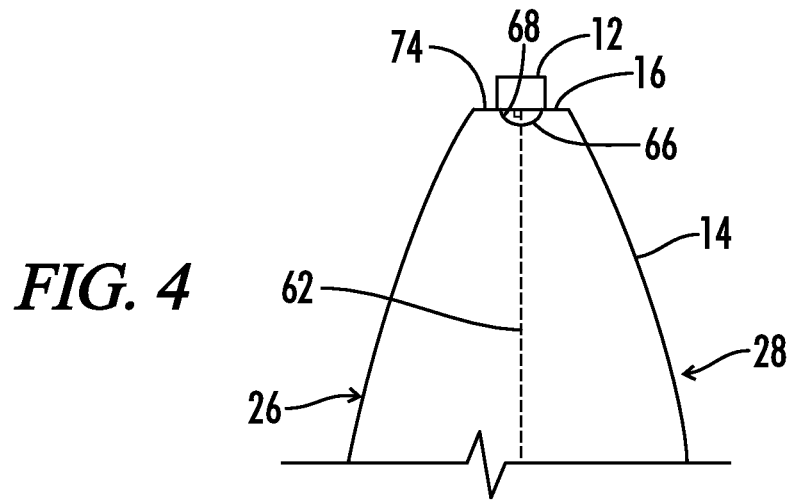
FIG. 4 is a detailed view of the apparatus of FIG. 2 showing a first embodiment of the coupling between the light source and the light guide body.
Figure 5:
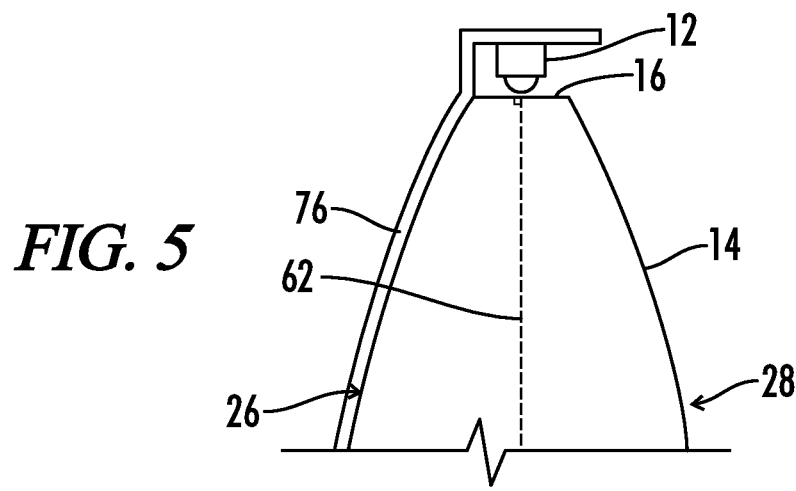
FIG. 5 is a detailed view of a second embodiment of the coupling between the light source and the light guide body.
Figure 6:
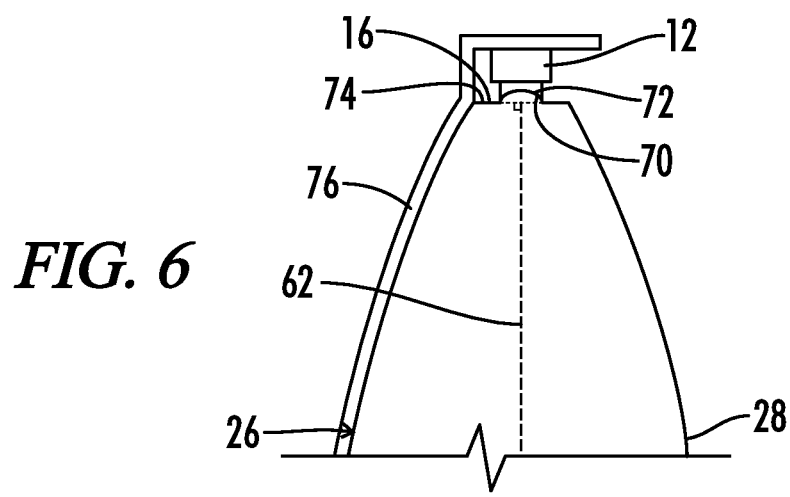
FIG. 6 is a detailed view of a third embodiment of the coupling between the light source and the light guide body.

In some embodiments, the input edge 16 can be coupled with the light source 12. Coupling of the input edge 16 with the light source 12 can help ensure that all of the light from the light source 12 enters the light guide body 14. In some embodiments, the input edge 16 can include a concave, convex, or dimpled surface. A detailed view of several embodiments of the coupling of the light source 12 with the input edge 16 can be seen in FIGS. 4-6. In FIG. 4, the input edge 16 includes a concave or dimpled surface 66 which can be coupled with a convex surface 68 of the light source 12. In FIG. 5, the input edge 16 can be a substantially flat surface and the light source 12 can be positioned directly above the input edge 16. In some embodiments, the light source 12 can include a substantially flat surface which mates with the input edge 16. In FIG. 6, the input edge 16 includes a convex surface 70 which is coupled with a concave surface 72 of the light source 12.

In those embodiments where the input edge 16 includes a concave, dimpled, or convex surface, the substantially normal reference axis 62 can be substantially normal to the a general reference plane 74 of the input edge 16, as opposed to being normal to the coupling surfaces of the input edge 16.

In some embodiments, the lighting apparatus 10 can include a housing 76. The housing 76 at least partially encloses the light source 12 and the light guide body 14. In FIGS. 5 and 6 it can be seen that the housing 76 can be used to maintain the coupling between the light source 12 and the light guide body 12 when the light source is not directly connected to the light guide body 14. Additionally, as can be seen in FIGS. 5 and 6, the housing 76 can extend down the reflective side 26 of the light guide body 14. In some embodiments, the housing 76 can be made from a reflective material such that the housing 76 can act as a reflective film over the reflective side 26 that redirects light from the light source 12 towards the output side 28.

A second embodiment of an edge-lit lighting apparatus 10 of the present invention is shown in FIG. 7. The embodiment of FIG. 7 is similar to the embodiment of FIG. 2 in that the mean elongation plane 20 of the light guide body 14 is angularly offset from the primary emission direction 18 such that the reflective side 26 traverses the primary emission direction 18. The offset angle 32 between the primary emission direction 18 and the mean elongation plane 20 in FIG. 7 is larger than the corresponding angle in the embodiment shown in FIG. 2. Additionally, the entire output side 28 of the embodiment of FIG. 7 is an output surface which can include diffusers, micro lenses, micro prisms, Fresnel patterns, kinoforms, or other optical features to produce a desired lighting profile.

Figure 8:
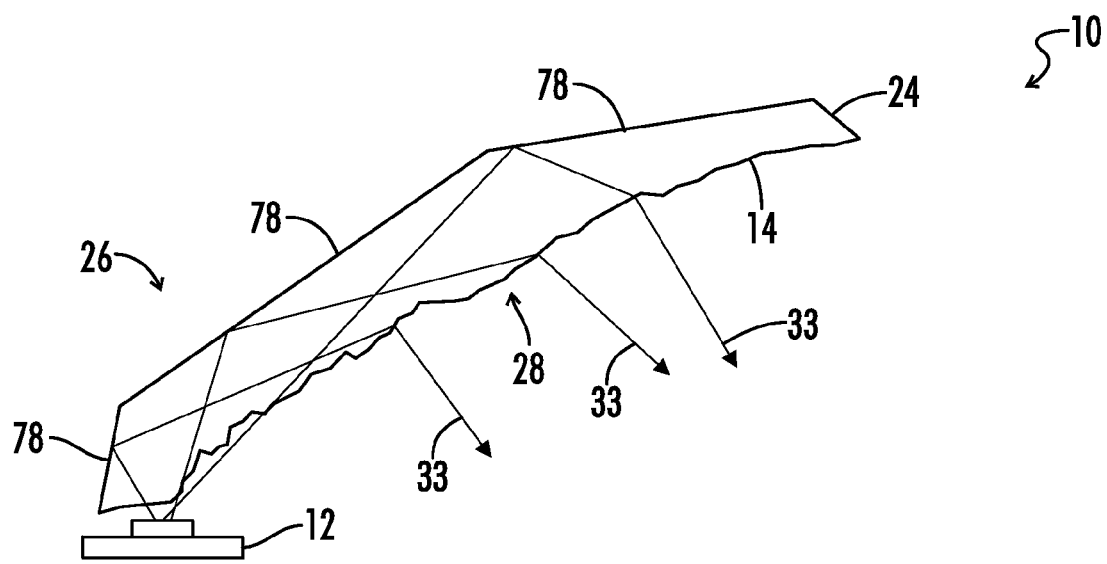
FIG. 8 is a side view of a third embodiment of an edge-lit apparatus according to the present invention.

A third embodiment of an edge-lit lighting apparatus of the present invention is shown in FIG. 8. The embodiment of FIG. 8 is similar to the embodiment of FIG. 7, but the reflective side 26 of the embodiment of FIG. 8 includes multiple flat angled surfaces 78, as opposed to the curved surfaces seen in FIG. 2 and FIG. 7. Again, the flat angled surfaces 78 can be configured to be total internal reflective surfaces such that each surface is configured to reflect any light from the light source that contacts the surface. Additionally, the flat angled surfaces 78 can include a reflective finish or film which can aid in reflection of the light from the light source 12. The reflective side 26 in some embodiments can be of any suitable shape to produce total internal reflection of the light from the light source 12 towards the output side 28.

Referring again to FIG. 1, in some embodiments, the lighting apparatus 10 can include a second light source 80. The second light source 80 can be positioned to project light through the input edge 16 in the primary emission direction 18. In other embodiments, the lighting apparatus may further include a plurality of light sources 82, each light source in the plurality of light sources 82 positioned to project light through the input edge 16 in the primary emission direction 18. Additional light sources can help increase the overall output of the lighting apparatus 10 which may be desirable for different applications.

Thus, although there have been described particular embodiments of the present invention of a new and useful Linear Indirect LED Lighting System it is not intended that such references be construed as limitations upon the scope of this invention except as set forth in the following claims.

What is claimed is:

1. An edge-lit lighting apparatus comprising:
   a light source; and
   a light guide body comprising
      an input edge defined by at least a first boundary and a second boundary, the light source positioned to project light through the input edge between the first and second boundaries in a primary emission direction, the light guide body extending from the first and second boundaries of the input edge in elongation directions that vary with distance of the light guide body from the input edge, the elongation directions having an average elongation direction that defines a mean elongation plane angularly offset from the primary emission direction;
      a reflective side adjacent the input edge at the first boundary, the reflective side extending from the first boundary of the input edge to a distal end of the light guide body, the reflective side having a curvilinear profile configured to receive and redirect light from the light source;
      an output side adjacent the input edge at the second boundary, the output side extending from the second boundary of the input edge to the distal end of the light guide body, the output side having an output portion configured to disperse redirected light from the reflective side: and
      a camber line extending from the input edge to the distal end, the camber line equidistant from the reflective side and the output side, the camber line tangent to the mean elongation plane.

2. The apparatus of claim 1, wherein the light guide body extends from the input edge in a curvilinear direction.

3. The apparatus of claim 1, wherein the reflective side is a parabolic surface.

4. The apparatus of claim 1, wherein the reflective side is a total internal reflective surface.

5. The apparatus of claim 1, wherein the reflective side further comprises a reflective finish.

6. The apparatus of claim 1, wherein the output side further comprises at least one of a diffuser, a micro lens, a micro prism, a Fresnel pattern, or a kinoform.

7. The apparatus of claim 1, wherein the reflective side includes a first reflective surface and a second reflective surface.

8. The apparatus of claim 1, wherein:
the input edge of the light guide body is configured to be coupled with the light source; and
the input edge includes at least one of a concave, convex, or dimpled surface.

9. The apparatus of claim 1 further comprising a second light source, the second light source positioned to project light through the input edge in the primary emission direction.

10. The apparatus of claim 1, further comprising a housing at least partially enclosing the light source and the light guide body.

11. The apparatus of claim 1, wherein the output side has a reflective portion and an output portion.

12. The apparatus of claim 11, wherein the reflective side and the reflective portion of the output side are configured to obstruct a direct view of the light source.

13. The apparatus of claim 11, wherein:
the reflective side further comprises a first coupling surface adjacent the input edge and a primary reflective surface;
the reflective portion of the output side further comprises a second coupling surface adjacent the input edge; and
the first and second coupling surfaces are configured to redirect at least a portion of the light from the light source towards the primary reflective surface.

14. The apparatus of claim 11, wherein the light guide body further comprises an extrusion axis, and the light guide body has a uniform cross section along the extrusion axis.

15. An edge-lit light guide apparatus for emitting light from a light source comprising:
a light guide body comprising
an input edge having a first boundary and a second boundary, the input edge configured to receive light from a light source in a direction along an emission axis, the light guide extending from the input edge in elongation directions, which elongation directions vary with increasing angles from the emission axis as a distance of the light guide body increases from the input edge,
a mean elongation plane angularly offset from a substantially normal reference axis to the input edge, the mean elongation plane being oriented in a direction defined by an average of the elongation directions of the light guide,
a reflective side adjacent the input edge at the first boundary, the reflective side extending from the input edge to a distal end of the light guide body, the reflective side having a curvilinear profile configured to receive and redirect light from the light source when the light source projects light through the input edge, and
an output side adjacent the input edge at the second boundary, the output side extending from the second boundary to the distal end of the light guide body, the output side having an output portion configured to receive and disperse redirected light from the reflective side.

16. The apparatus of claim 15, wherein the entire output side comprises at least one of a diffuser, a micro lens, a micro prism, a Fresnel pattern, or a kinoform.

17. The apparatus of claim 15, wherein the input edge further comprises a concave portion, the concave portion configured to be coupled with the light source.

18. An edge-lit lighting apparatus comprising:
a light source; and
a curved light guide body comprising
an input edge coupled with the light source, the input edge having a first boundary and a second boundary, the light source positioned to project light through the input edge between the first boundary and the second boundary, the light projected in a primary emission direction, the light guide body extending substantially curvilinearly from the input edge,
a total internal reflective side adjacent the input edge, the total internal reflective side extending from the first boundary of the input edge to a distal end of the guide body, the total internal reflective side configured to receive and redirect light from the light source, and
an output side adjacent the input edge, the output side extending from the second boundary of the input edge to the distal end of the guide body, the output side positioned to receive and disperse redirected light from the total internal reflective side.

19. The apparatus of claim 18, further comprising a plurality of light sources coupled with the input edge, the plurality of light sources projecting light through the input edge in the primary emission direction.

20. The apparatus of claim 18, wherein the curved light guide apparatus includes a mean elongation axis angularly offset from the primary emission direction.

* * * * *